H. ANDREWS.
Parallel-Rulers.
No. 158,452.
Patented Jan. 5, 1875.
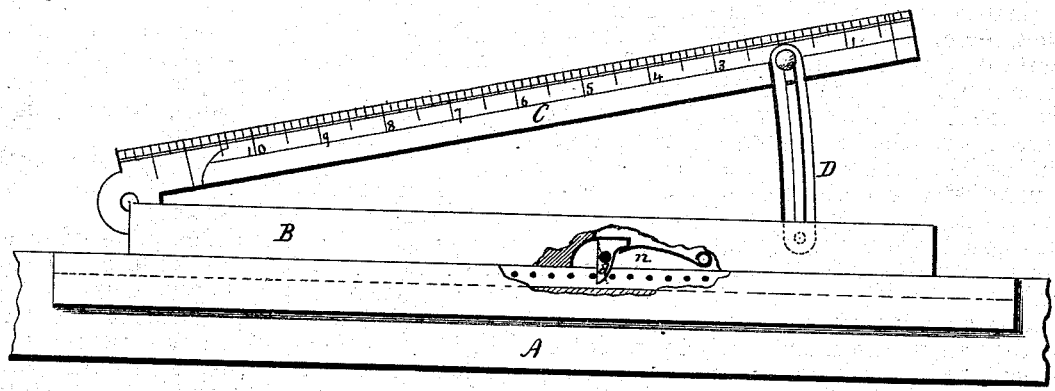

UNITED STATES PATENT OFFICE.

HORACE ANDREWS, OF NEW HAVEN, CONNECTICUT.

IMPROVEMENT IN PARALLEL RULERS.

Specification forming part of Letters Patent No. 158,452, dated January 5, 1875; application filed July 13, 1874.

*To all whom it may concern:*

Be it known that I, HORACE ANDREWS, of New Haven, in the county of New Haven and State of Connecticut, have invented a new Improvement in Parallel Ruler; and I do hereby declare the following, when taken in connection with the accompanying drawing and the letters of reference marked thereon, to be a full, clear, and exact description of the same, and which said drawing constitutes part of this specification, and represents a top view, portions broken away to show the mechanism.

This invention relates to an improvement in mathematical instruments designed for ruling a succession of equidistant parallel lines—what is technically known as "section lining," the object being to equally space the distances, and make the instrument adjustable to different widths of spaces; and the invention consists in a stationary bar or blade, constructed with a series of teeth or notches, combined with a sliding bar provided with a pawl turning freely in one direction to pass the teeth on the stationary bar, but to hold against the teeth in the opposite direction; also, in combining, with the movable bar, a second bar, hinged to the first, and adjustable, relatively to the stationary bar, as to parallelism, as and for the purpose more fully hereinafter described.

A is the stationary bar, constructed with teeth upon one edge, (the teeth here shown as a series of pins, *a*, set in a groove in the edge of the bar, and spaced equidistant.) B is the movable bar, provided with a pawl, *d*, in one edge, corresponding to the groove in the bar A. The said pawl is hung in the bar so as to turn back, as denoted in broken lines, but arrested so as not to move in the opposite direction. A spring, *n*, arranged as shown, or otherwise, tends to hold the pawl in the position shown, but yet allowing it to be turned back.

In use, the bar A is held, and the bar B moved along close to the edge of the bar A. In thus moving, the pawl passes over the successive teeth. If the spaces required be one tooth only, then the bar is brought back until the pawl sets against each successive tooth; or more than one tooth may be taken at a time, if desired, to widen the spacing.

The opposite or outer edge of the bar should be inclined. Hence a line made by the edge of the incline, then the bar moved one or more teeth, will move the inclined edge from the line so made, accordingly as the incline is greater or less. Therefore, to vary the spaces, bars with different inclines may be used interchangeably.

In order to make one bar answer the purpose for various angles, I hinge a bar, C, to the bar B, and attach a link or slotted arm, D, by which the bar C may be set at any desired angle, and thereby vary the width of the spaces relatively to the movement of the bar B, as indicated by the teeth in the edge of the bar.

I claim as my invention—

1. The stationary bar A, provided with teeth in one edge, combined with the movable bar B, provided with a pawl, *d*, constructed so as to pass freely over the teeth in one direction, but to set against the teeth in the opposite direction, substantially as described.

2. In combination with the stationary bar A, provided with teeth in one edge, the movable bar B, provided with the pawl *d*, the adjustable bar C, substantially as described.

HORACE ANDREWS.

Witnesses:
JOHN E. EARLE,
J. H. SHUMWAY.